US012405556B2

(12) United States Patent
Noguchi

(10) Patent No.: US 12,405,556 B2
(45) Date of Patent: Sep. 2, 2025

(54) IMAGE FORMING APPARATUS

(71) Applicant: BROTHER KOGYO KABUSHIKI KAISHA, Nagoya (JP)

(72) Inventor: Yoko Noguchi, Chita (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 232 days.

(21) Appl. No.: 18/307,178

(22) Filed: Apr. 26, 2023

(65) Prior Publication Data

US 2023/0350326 A1 Nov. 2, 2023

(30) Foreign Application Priority Data

Apr. 28, 2022 (JP) ................................ 2022-074747

(51) Int. Cl.

*G03G 15/20* (2006.01)
*G03G 15/00* (2006.01)
*G03G 15/23* (2006.01)

(52) U.S. Cl.

CPC ..... *G03G 15/2017* (2013.01); *G03G 15/2039* (2013.01); *G03G 15/231* (2013.01); *G03G 15/5008* (2013.01); *G03G 15/5029* (2013.01); *G03G 2215/00156* (2013.01); *G03G 2215/0097* (2013.01)

(58) Field of Classification Search

CPC ........... G03G 15/2017; G03G 15/2039; G03G 15/231; G03G 15/5008; G03G 15/5029; G03G 2215/00156; G03G 2215/0097

See application file for complete search history.

(56) References Cited

U.S. PATENT DOCUMENTS

| | | | | |
|---|---|---|---|---|
| 2011/0262158 | A1 | 10/2011 | Hitoshi | |
| 2012/0033987 | A1 | 2/2012 | Ikegami et al. | |
| 2015/0037055 | A1 | 2/2015 | Kitagawa et al. | |
| 2017/0090398 | A1* | 3/2017 | Kato | G03G 15/80 |
| 2020/0379382 | A1* | 12/2020 | Takeuchi | G03G 15/2039 |
| 2022/0011720 | A1* | 1/2022 | Hirajima | G03G 15/6564 |

FOREIGN PATENT DOCUMENTS

| | | | |
|---|---|---|---|
| JP | 2011-33713 | A | 2/2011 |
| JP | 2011-242746 | A | 12/2011 |
| JP | 2013-231803 | A | 11/2013 |

* cited by examiner

*Primary Examiner* — Stephanie E Bloss
*Assistant Examiner* — Michael A Harrison
(74) *Attorney, Agent, or Firm* — Merchant & Gould P.C.

(57) ABSTRACT

An image forming apparatus includes: an image forming unit; a conveying unit; a fixing unit including a heater and a temperature detector; and a controller. The controller is configured to execute: first conveying processing of controlling the conveying unit to start conveying the sheet after a first time period has elapsed since the temperature detected by the temperature detector reaches a first temperature, second conveying processing of controlling the conveying unit to start conveying the sheet in response to the temperature reaches the first temperature, third conveying processing of controlling the conveying unit to start conveying the sheet in response to the temperature reaches a second temperature that is lower than the first temperature, and determination processing of determining, according to a plurality of printing conditions, which of the first conveying processing, the second conveying processing, and the third conveying processing is to be executed.

15 Claims, 7 Drawing Sheets

IMAGE FORMING APPARATUS

REFERENCE TO RELATED APPLICATIONS

This application claims priority from Japanese Patent Application No. 2022-074747 filed on Apr. 28, 2022. The entire content of the priority application is incorporated herein by reference.

BACKGROUND ART

The present disclosure relates to an image forming apparatus.

A related-art controller of an image forming apparatus sets a conveying speed, a target temperature for fixing temperature adjustment, and a sheet feeding permission temperature based on information on a type of a recording material and the number of sheets to be printed when an image forming job is received. The sheet feeding permission temperature is a temperature of a fixing roller, which is a trigger for starting image formation by operating a sheet feeding unit after switching the target temperature at the same time when the controller outputs a job start signal.

The sheet feeding unit operates when a temperature of the fixing roller detected by a temperature sensor exceeds the sheet feeding permission temperature. The controller changes the sheet feeding permission temperature depending on whether the number of sheets to be printed is equal to or greater than a predetermined number or less than the predetermined number. The sheet feeding permission temperature in a case where the number of sheets to be printed is less than the predetermined number is set to be lower than the sheet feeding permission temperature in a case where the number of sheets to be printed is equal to or greater than the predetermined number.

DESCRIPTION

In the related-art image forming apparatus, the sheet feeding permission temperature in the case where the number of sheets to be printed is equal to or greater than the predetermined number is set to be higher than the sheet feeding permission temperature in the case where the number of sheets to be printed is less than the predetermined number. Depending on printing conditions at the time of continuous printing, even if the number of sheets to be printed is equal to or greater than the predetermined number, a temperature of a nip portion may not decrease much. In this case, even if the number of sheets to be printed is equal to or greater than the predetermined number, it is not necessary to set the sheet feeding permission temperature to be high, and a sheet feeding start timing may be unnecessarily delayed.

The present disclosure has been made in view of the above problem, and an object of the present disclosure is to prevent a conveying start timing of a sheet from being unnecessarily delayed.

The controller determines, according to the plurality of printing conditions, which of the first conveying processing, the second conveying processing, and the third conveying processing is to be executed. Therefore, as compared with a case where the conveying processing is changed only according to a condition regarding the number of sheets to be printed, a conveying start timing of the sheet can be prevented from being unnecessarily delayed.

When the length of the sheet along the conveying direction is short, a temperature of the fixing unit is unlikely to decrease. Therefore, a first paper output time (FPOT) can be shortened by advancing the conveying start timing of the sheet as the length of the sheet along the conveying direction reduces.

When the sheet is thick, the temperature of the fixing unit is likely to decrease. Therefore, by delaying the conveying start timing of the sheet as the thickness of the sheet increases, the sheet can be prevented from being conveyed in a state where the temperature of the fixing unit is decreased, and a failure of fixing the image onto the sheet can be prevented from occurring.

When the temperature outside the image forming apparatus is high, the temperature of the fixing unit is unlikely to decrease. Therefore, the FPOT can be shortened by advancing the conveying start timing of the sheet as the temperature outside the image forming apparatus increases.

When the conveying speed of the sheet is high, the temperature of the fixing unit is likely to decrease. Therefore, by delaying the conveying start timing of the sheet as the conveying speed of the sheet increases, the sheet can be prevented from being conveyed in a state where the temperature of the fixing unit is decreased, and a failure of fixing the image onto the sheet can be prevented from occurring.

In a case where the double-sided printing is set, since the fixing unit can store heat while the sheet is turned over after one-side printing on the sheet is completed, the temperature of the fixing unit is unlikely to decrease. Therefore, when the double-sided printing is set, the FPOT can be shortened by advancing the conveying start timing of the sheet.

In the first conveying processing and the second conveying processing, the controller starts the conveying after the detection temperature of the temperature detector reaches the fixing temperature that is the target temperature for the heat fixing executed by the fixing unit. Therefore, a decrease in the fixing strength of the image onto the sheet S can be further prevented.

Since the sheet starts to be conveyed after the fixing unit reaches a fixing possible temperature when the sheet reaches the nip portion, the fixing strength of the image onto the sheet can be sufficiently maintained without causing a fixing failure of the image onto the sheet.

In a case where the plurality of printing conditions each has a priority order, the controller can more appropriately determine the conveying start timing of the sheet in the determination processing.

In a case where each of the plurality of printing conditions has the weighting coefficient, the controller can more appropriately determine the conveying start timing of the sheet in the determination processing.

According to an aspect of the present disclosure, the conveying start timing of the sheet can be prevented from being unnecessarily delayed.

FIRST EMBODIMENT

{Overall Configuration of Image Forming Apparatus 1}

Figure 1:
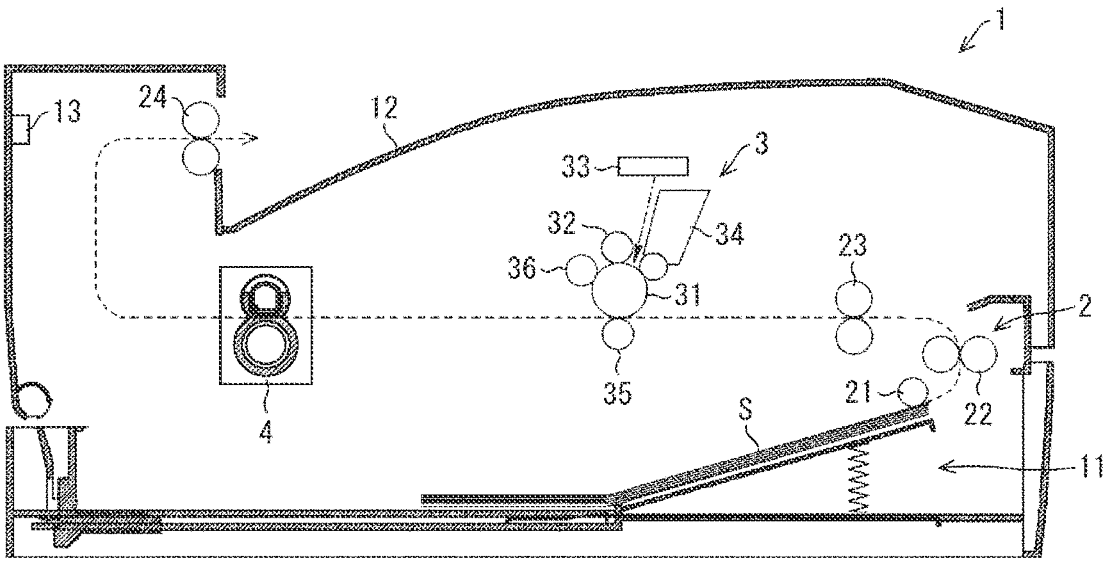
FIG. 1 is a cross-sectional view showing a configuration of an image forming apparatus according to a first embodiment of the present disclosure.

FIG. 1 is a cross-sectional view showing a configuration of an image forming apparatus 1 according to a first embodiment of the present disclosure. Although the image forming apparatus 1 is a monochrome printer, the scope of application of the present disclosure is not limited to a monochrome printer, and the present disclosure is also applicable to a color printer. In the present embodiment, a laser printer that forms an image on a sheet S using a toner will be described as an example of the image forming apparatus 1.

As shown in FIG. 1, the image forming apparatus 1 includes a conveying unit 2, an image forming unit 3, a fixing unit 4, a sheet tray 11, a discharge tray 12, and a temperature sensor 13. The conveying unit 2 conveys the sheet S, and includes a pickup roller 21, conveying rollers 22, registration rollers 23, and discharge rollers 24. Examples of the sheet S include recording paper, an over head projector (OHP), an envelope, and thick paper.

The sheet tray 11 is a tray for accommodating sheets S before printing. The pickup roller 21 conveys the sheets S one by one from the sheet tray 11. The conveying rollers 22 convey the sheet S conveyed by the pickup roller 21 to the registration rollers 23. The registration rollers 23 align a position of a leading end of the sheet S and then convey the sheet S toward the image forming unit 3.

The temperature sensor 13 detects a temperature outside the image forming apparatus 1. Specifically, the temperature sensor 13 is provided inside a case of the image forming apparatus 1, and detects the temperature outside the image forming apparatus 1 by detecting a temperature inside the case of the image forming apparatus 1. Since there is no difference between the temperature inside the case of the image forming apparatus 1 and the temperature outside the image forming apparatus 1, the temperature inside the case of the image forming apparatus 1 is regarded as the temperature outside the image forming apparatus 1.

The image forming unit 3 forms an image on the sheet S conveyed by the registration rollers 23, and includes a photoconductor 31, a charger 32, an exposure device 33, a developing unit 34, a transfer device 35, and a cleaning unit 36.

The photoconductor 31 includes a tube made of a conductive metal such as aluminum, and a photosensitive layer provided on an outer circumferential surface of the tube. The photoconductor 31 is an organic photoconductor (OPC) and is a photosensitive drum including a positively chargeable photosensitive layer in which polarity of an image forming potential is positive. The photosensitive layer of the photoconductor 31 is charged by the charger 32 while the photoconductor 31 rotates, and the photoconductor 31 is exposed to laser light from the exposure device 33, and an electrostatic latent image is formed on a surface thereof. The photoconductor 31 may be a photosensitive belt in which a photosensitive layer is provided on an outer circumferential surface of an annular belt made of metal.

The charger 32 charges the surface of the photoconductor 31, and is, for example, a charging roller that contacts and charges the photoconductor 31, or a scorotron charger that charges the photoconductor 31 in a non-contact manner. The exposure device 33 exposes the surface of the photoconductor 31 charged by the charger 32. The exposure device 33 includes, for example, a plurality of light emitting elements arranged in a line along a direction of a rotation axis of the photoconductor 31, and forms an electrostatic latent image on the surface of the photoconductor 31 by emitting light according to printing data.

The developing unit 34 supplies a developer to the electrostatic latent image formed on the surface of the photoconductor 31, and includes, for example, a developing roller and a developing container accommodating the developer. The transfer device 35 transfers the developer imageformed on the surface of the photoconductor 31 to the sheet S, and is, for example, a transfer roller. The cleaning unit 36 removes the developer remaining on the photoconductor 31, paper dust attached to the photoconductor 31, and the like from the photoconductor 31, and is, for example, a cleaning roller.

The fixing unit 4 fixes the image formed on the sheet S by the image forming unit 3. Details of the fixing unit 4 will be described later. The discharge rollers 24 discharge the sheet S on which the image is fixed by the fixing unit 4 to the discharge tray 12. The discharge tray 12 is a tray on which the sheet S after printing is discharged and placed.

Figure 2:
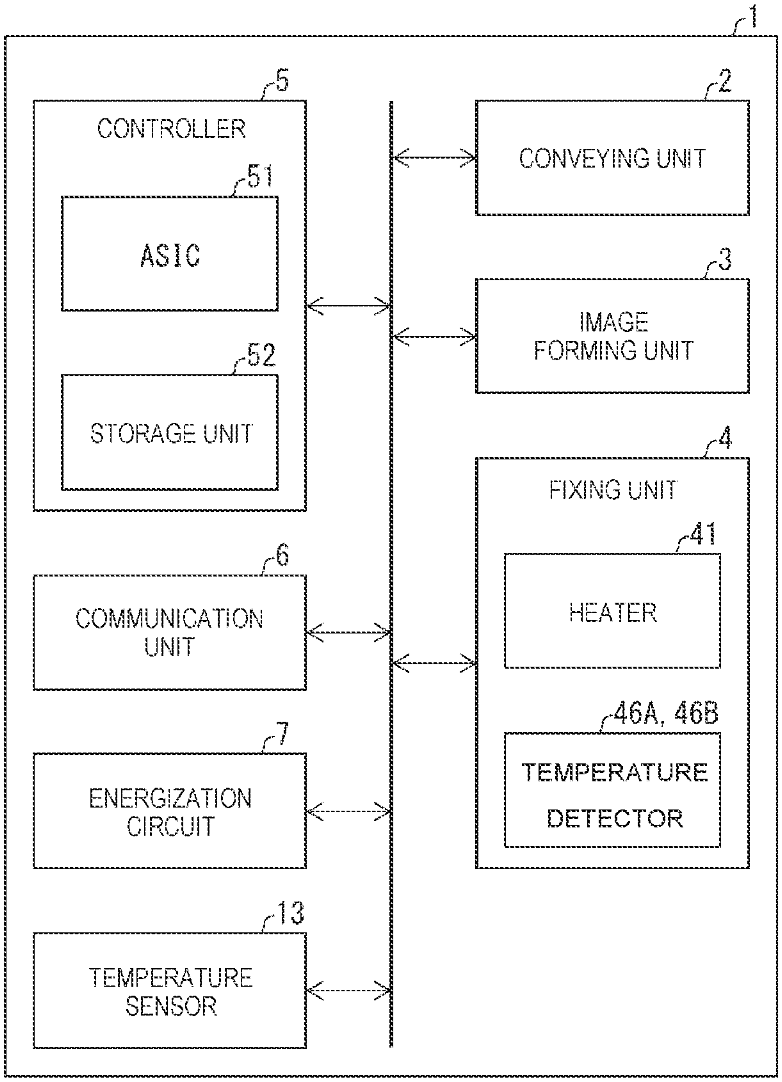
FIG. 2 is a block diagram showing a main part configuration of the image forming apparatus shown in FIG. 1.

FIG. 2 is a block diagram showing a main part configuration of the image forming apparatus 1 shown in FIG. 1. As shown in FIG. 2, the image forming apparatus 1 includes a controller 5, a communication unit 6, and an energization circuit 7. The controller 5 is a controller that controls each unit of the image forming apparatus 1, and controls, for example, the conveying unit 2, the image forming unit 3, the fixing unit 4, the communication unit 6, and the energization circuit 7.

The controller 5 is electrically connected to the temperature sensor 13. The controller 5 includes an application specific integrated circuit (ASIC) 51 and a storage unit 52. The controller 5 causes the image forming apparatus 1 to perform printing processing and processing associated therewith by executing various kinds of processing.

The controller 5 may include a processor such as a central processing unit (CPU). In this case, a control program for implementing a printing control method may be stored in the storage unit 52. Then, the processor of the controller 5 may operate according to the control program stored in the storage unit 52 to execute the printing processing in the image forming apparatus 1.

The controller 5 may include a computer-readable recording medium storing the control program. The recording medium may be a "non-transitory tangible medium" such as a ROM (Read Only Memory), a magnetic disk, a card, a semiconductor memory, or a programmable logic circuit.

As the recording medium, a RAM (Random Access Memory) or the like in which the control program is loaded may be used. The control program may be supplied to the computer via any transmission medium such as a communication network or broadcast waves capable of transmitting the control program. The storage unit 52 is a memory capable of reading and writing information. The storage unit 52 is a RAM or an NVM (Non-Volatile Memory). The storage unit 52 stores predetermined information such as the number of sheets to be printed.

The communication unit 6 includes a communication interface, and performs two-way data communication with an external device of the image forming apparatus 1 via a wired or wireless network. The energization circuit 7 includes a switching element such as a triac. The energization circuit 7 switches between an energized state in which a current is supplied from an alternating current power supply (not shown) to a heater 41 of the fixing unit 4 and a non-energized state in which no current is supplied, by turning on or off the switching element according to an instruction from the controller 5.

{Configuration of Fixing Unit 4}

Figure 3:
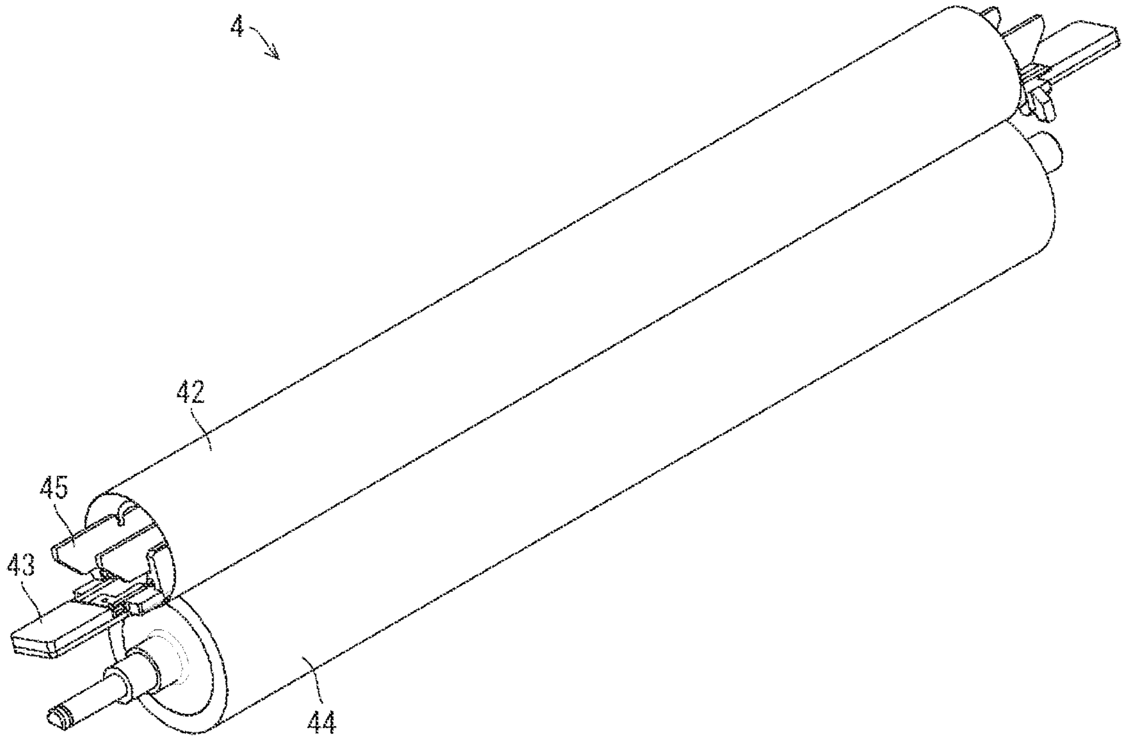
FIG. 3 is a perspective view of a fixing unit provided in the image forming apparatus shown in FIG. 1.
Figure 4:
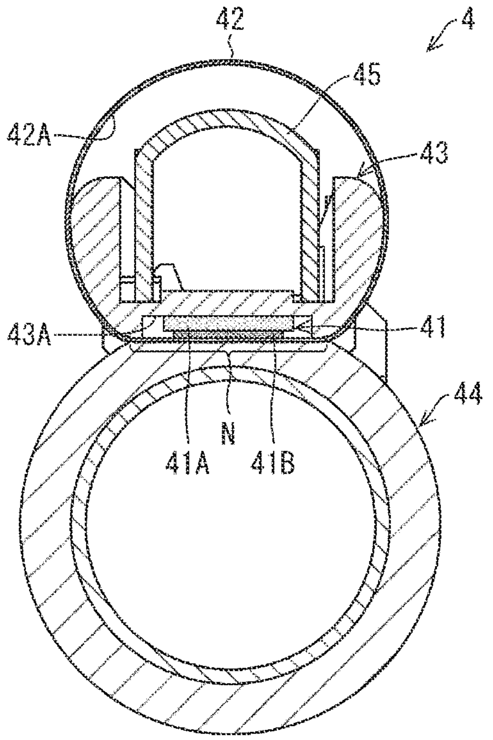
FIG. 4 is a cross-sectional view of the fixing unit shown in FIG. 3.
Figure 5:
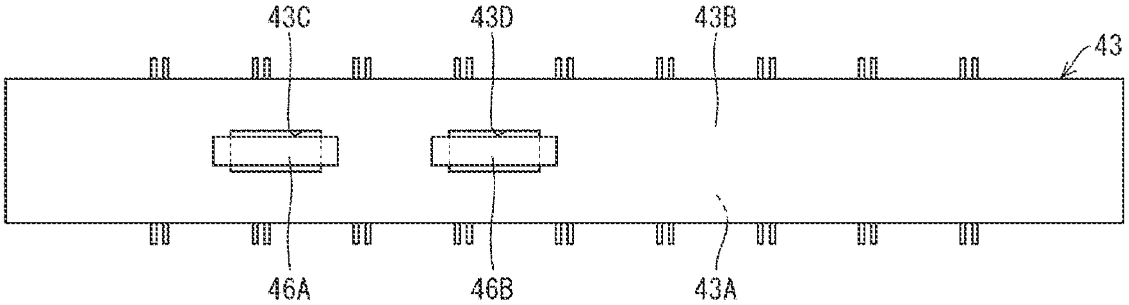
FIG. 5 is a plan view showing a holder and a temperature detector provided in the fixing unit shown in FIG. 3.

FIG. 3 is a perspective view of the fixing unit 4 provided in the image forming apparatus 1 shown in FIG. 1, and FIG. 4 is a cross-sectional view of the fixing unit 4 shown in FIG. 3. FIG. 5 is a plan view showing a holder 43 and temperature detectors 46A and 46B provided in the fixing unit 4 shown in FIG. 3. As shown in FIGS. 3 to 5, the fixing unit 4 includes the heater 41, a belt 42, the holder 43, a pressing roller 44, a stay 45, and the temperature detectors 46A and 46B.

As shown in FIG. 4, the heater 41 is a heat source and has a plate shape extending in a longitudinal direction of the fixing unit 4. The heater 41 includes a substrate 41A and a resistance heating element 41B. The substrate 41A has a plate shape extending along the longitudinal direction of the fixing unit 4. The resistance heating element 41B is provided on the substrate 41A along the longitudinal direction of the fixing unit 4.

The longitudinal direction of the fixing unit 4 is a direction parallel to a rotation axis of the pressing roller 44 and is a direction perpendicular to a conveying direction of the sheet S at a nip portion N to be described later. In other words, the longitudinal direction of the fixing unit 4 is a width direction of the sheet S passing through the nip portion N.

Further, wiring, terminals, and the like for supplying power to the resistance heating element 41B are also provided on the substrate 41A. A ceramic substrate is used as the substrate 41A. That is, the heater 41 is a ceramic heater. In this case, the heater 41 is a heater having a low thermal capacity. The heater 41 may be a steel heater in which a metal substrate, more specifically, a steel substrate is used as the substrate 41A.

The belt 42 is an endless belt that includes an inner circumferential surface 42A in contact with the heater 41 and rotates around the heater 41. Further, the belt 42 is a cylindrical member having a low thermal capacity. The belt 42 is made of a single-layer or composite-layer film having heat resistance, releasability, strength, durability, and the like.

The holder 43 is a member that supports the heater 41 and maintains the rotation of the belt 42, and is made of a heat-resistant and insulating resin material. The holder 43 has a support surface 43A that supports the heater 41. The support surface 43A supports the heater 41 while facing a back surface of the heater 41, that is, a surface of the substrate 41A opposite to the resistance heating element 41B. The heater 41 is disposed such that a front surface on which the resistance heating element 41B is provided faces the inner circumferential surface 42A of the belt 42.

The pressing roller 44 is an example of a pressing rotating body, and forms the nip portion N by nipping the belt 42 between the pressing roller 44 and the front surface of the heater 41. Both ends of the pressing roller 44 are respectively supported by a pair of side frames via bearings. The pressing roller 44 is driven to rotate by a motor provided in the image forming apparatus 1, and the belt 42 is driven to rotate following the rotation of the pressing roller 44.

The stay 45 is a member for increasing rigidity of the holder 43, and is disposed on an opposite side of the support surface 43A of the holder 43. When the rigidity of the holder 43 is high, the stay 45 can be omitted.

The pressing rotating body is not limited to the pressing roller 44, and may include, for example, a pressing belt and a nip forming member. That is, as the nip forming member, an elastic pad, a resin or metal pressing plate, or the like is disposed in a space surrounded by the pressing belt. The nip forming member is pressed against the front surface of the heater 41 via the belt 42 and the pressing belt to form the nip portion N.

As shown in FIG. 5, the temperature detectors 46A and 46B are provided to face a back surface 43B of the holder 43 opposite to the support surface 43A. Holes 43C and 43D are formed in the back surface 43B of the holder 43. The temperature detector 46A is in contact with the back surface of the heater 41 through the hole 43C. The temperature detector 46B is in contact with the back surface of the heater 41 through the hole 43D. The temperature detectors 46A and 46B detect a temperature of the heater 41. The temperature detectors 46A and 46B are thermistors, but may be other temperature detectors such as thermostats.

{Processing of Controller 5}

Figure 6:
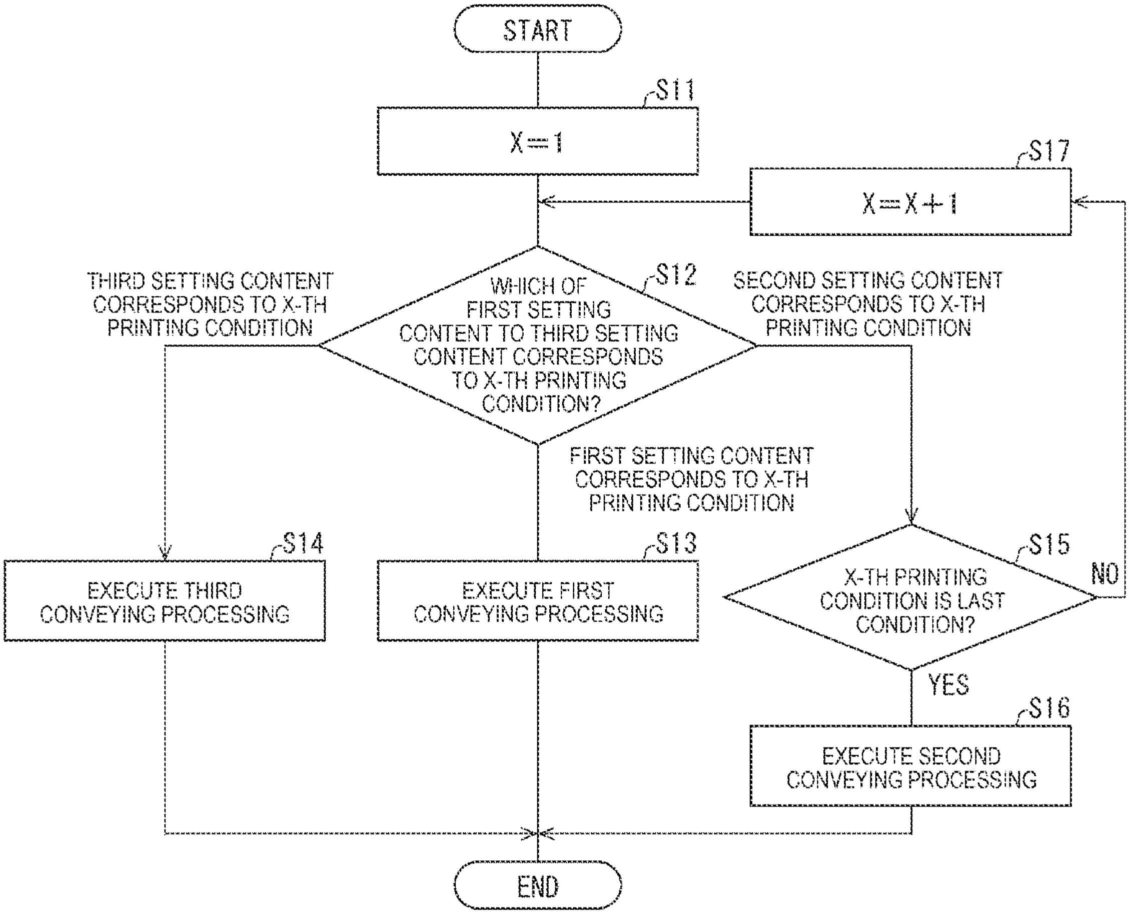
FIG. 6 is a flowchart showing an example of processing of a controller shown in FIG. 2.

FIG. 6 is a flowchart showing an example of processing of the controller 5 shown in FIG. 2. The controller 5 executes, according to a first printing condition to a sixth printing condition as a plurality of printing conditions, determination processing of determining which of first conveying processing, second conveying processing, and third conveying processing is to be executed.

The controller 5 receives a print job from an external device of the image forming apparatus 1 via the communication unit 6. When receiving the print job, the controller 5 executes printing preparation processing. For example, in the printing preparation processing, the controller 5 starts supplying electric power to the heater 41 by supplying a current to the heater 41 using the energization circuit 7. Accordingly, power is supplied to the resistance heating element 41B of the heater 41, and the temperature of the heater 41 rises.

After executing the printing preparation processing, the controller 5 substitutes 1 for a variable X (S11). After substituting 1 for the variable X, the controller 5 executes, for an X-th printing condition, determination processing (S12) of determining which of a first setting content to a third setting content corresponds to the X-th printing condition. When it is determined in S12 that the first setting content corresponds to the X-th printing condition, the controller 5 executes processing of S13. When it is determined in S12 that the third setting content corresponds to the X-th printing condition, the controller 5 executes processing of S14. When it is determined in S12 that the second setting content corresponds to the X-th printing condition, the controller 5 executes processing of S15.

In a case where determined in S12 that the first setting content corresponds to the X-th printing condition, the controller 5 executes the first conveying processing (S13). Specifically, the controller 5 executes the first conveying processing in which conveying executed by the conveying unit 2 is started after a first time period has elapsed since the detection temperatures of the temperature detectors 46A and 46B reach a first temperature. The first temperature is a fixing temperature that is a target temperature for heat fixing executed by the fixing unit 4. The first time period is, for example, 2 seconds.

In a case where determined in S12 that the third setting content corresponds to the X-th printing condition, the controller 5 executes the third conveying processing (S14). Specifically, the controller 5 executes the third conveying processing in which the conveying executed by the conveying unit 2 is started when the detection temperatures of the temperature detectors 46A and 46B reach a second temperature lower than the first temperature. The controller 5 may execute the third conveying processing to start conveying the sheet by the conveying unit 2 before the first time period is elapsed since the temperatures detected by the temperature detectors 46A and 46B reach the second temperature.

In a case where determined that the second setting content corresponds to the X-th printing condition, the controller 5 determines whether the X-th printing condition is a last condition among the plurality of printing conditions (S15). In a case where determined that the X-th printing condition is the last condition (YES in S15), the controller 5 executes the second conveying processing (S16). Specifically, the controller 5 executes the second conveying processing in which the conveying executed by the conveying unit 2 is started when the detection temperatures of the temperature detectors 46A and 46B reach the first temperature. The controller 5 may execute the second conveying processing to start conveying the sheet by the conveying unit 2 before the first time period is elapsed since the temperatures detected by the detected by the temperature detectors 46A and 46B reach the first temperature.

In a case where determined that the X-th printing condition is not the last condition (NO in S15), the controller 5 increments a value of the variable X by one (S17). In S17, when X=1, the controller 5 increments the value of the variable X by one, so that the value of the variable X becomes 2. After incrementing the value of the variable X by one, the controller 5 proceeds to the processing of S12.

Then, the controller 5 executes the processing of S12 to S17 for each of the second printing condition to the sixth printing condition.

As described above, when executing the first conveying processing, the controller 5 delays the conveying start timing of the sheet S as compared with the second conveying processing and the third conveying processing, and causes the fixing unit 4 to store heat. Thus, the fixing strength of the image onto the sheet S can be sufficiently maintained. When executing the third conveying processing, the controller 5 advances the conveying start timing of the sheet S as compared with the first conveying processing and the second conveying processing, and can shorten a first paper output time (FPOT) and reduce power consumption. When executing the second conveying processing, the controller 5 advances the conveying start timing of the sheet S as compared with the first conveying processing, and delays the conveying start timing of the sheet S as compared with the third conveying processing.

The controller 5 executes the processing of S11 to S17 shown in FIG. 6 only for the first sheet S, and executes the third conveying processing for the second and subsequent sheets S. The controller 5 may execute the processing of S11 to S17 shown in FIG. 6 for not only the first sheet S but also the second and subsequent sheets S.

Hereinafter, the first printing condition to the sixth printing condition will be described in detail with reference to Table 1 below. Table 1 is an example of a table showing setting contents associated with respective printing conditions. "X" of the X-th printing condition shown in FIG. 6 is the same as "X" of the variable X. Therefore, in S12, when X=1, the controller 5 determines, for the first printing condition, which of the first setting content to the third setting content corresponds to the first printing condition.

TABLE 1

| Printing condition | Item | First setting content | Second setting content | Third setting content |
|---|---|---|---|---|
| First | The number of sheets to be printed | 51 ≤ N | 4 ≤ N ≤ 50 | 1 ≤ N ≤ 3 |
| Second | Length of sheet | 300 mm or more | 200 mm or more to less than 300 mm | Less than 200 mm |
| Third | Thickness of sheet | Thick | Medium | Thin |
| Fourth | Outside temperature | 20° C. or lower | From 21° C. to 35° C. | 36° C. or higher |
| Fifth | Conveying speed of sheet | 31 ppm or more | From 21 ppm to 30 ppm | 20 ppm or less |
| Sixth | One-side printing or double-sided printing | One-side printing | Double-sided printing | — |

{First Printing Condition}

As shown in Table 1, the first printing condition is the number of sheets to be printed included in the print job. That is, the plurality of printing conditions include at least the number of sheets to be printed. The first setting content, the second setting content, and the third setting content are set for the first printing condition.

The first setting content for the first printing condition is that the number of sheets to be printed is 51 or more. The second setting content for the first printing condition is that the number of sheets to be printed is 4 or more and 50 or less. The third setting content for the first printing condition is that the number of sheets to be printed is 1 or more and 3 or less.

When it is determined in S12 that the first setting content corresponds to the first printing condition, that is, the number of sheets to be printed is 51 or more, the controller 5 executes the first conveying processing.

In a case where determined that the third setting content corresponds to the first printing condition, that is, the number of sheets to be printed is 1 or more and 3 or less, the controller 5 executes the third conveying processing. In a case where determined that the second setting content corresponds to the first printing condition, that is, the number of sheets to be printed is 4 or more and 50 or less, the controller 5 executes the processing of S15.

When it is determined in S15 that the first printing condition is not the last condition (NO in S15), the controller 5 increments the value of the variable X by one in S17. Thus, the value of the variable X becomes 2. After incrementing the value of the variable X by one, the controller 5 proceeds to the processing of S12.

{Second Printing Condition}

As shown in Table 1, the second printing condition is a length of the sheet S in the conveying direction included in the print job. Thus, the plurality of printing conditions include the length of the sheet S in the conveying direction. The first setting content for the second printing condition is that the length of the sheet S in the conveying direction is 300 mm or more. The second setting content for the second printing condition is that the length of the sheet S in the conveying direction is 200 mm or more and less than 300 mm. The third setting content for the second printing condition is that the length of the sheet S in the conveying direction is less than 200 mm.

By executing the determination processing of S12, the controller 5 prioritizes execution of the third conveying processing, the second conveying processing, and the first conveying processing in this order as the length of the sheet S in the conveying direction decreases. When the length of the sheet S in the conveying direction is short, the temperature of the fixing unit 4 is unlikely to decrease. Therefore, the FPOT can be shortened by advancing the conveying start timing of the sheet S as the length of the sheet S along the conveying direction reduces.

{Third Printing Condition}

As shown in Table 1, the third printing condition is a thickness of the sheet S included in the print job. Thus, the plurality of printing conditions include the thickness of the sheet S. The first setting content for the third printing condition is that the thickness of the sheet S is set to "thick" in the print job. The second setting content for the third printing condition is that the thickness of the sheet S is set to "medium" in the print job. The third setting content for the third printing condition is that the thickness of the sheet S is set to "thin" in the print job. This means that the thickness of the sheet S is increased in order of "thin", "medium", and "thick". The "medium" thickness of the sheet S corresponds to a case where recycled paper is designated as an example.

By executing the determination processing of S12, the controller 5 prioritizes the execution of the first conveying processing, the second conveying processing, and the third conveying processing in this order as the thickness of the sheet S increases. When the sheet S is thick, the temperature of the fixing unit 4 is likely to decrease. Therefore, by delaying the conveying start timing of the sheet S as the thickness of the sheet S increases, the sheet S can be prevented from being conveyed in a state where the temperature of the fixing unit 4 is decreased, and a failure of fixing the image onto the sheet S can be prevented from occurring.

{Fourth Printing Condition}

As shown in Table 1, the fourth printing condition is a temperature outside the image forming apparatus 1 detected by the temperature sensor 13. Accordingly, the plurality of printing conditions include the temperature outside the image forming apparatus 1. The first setting content for the fourth printing condition is that the temperature outside the image forming apparatus 1 is 20° C. or lower. The second setting content for the fourth printing condition is that the temperature outside the image forming apparatus 1 is 21° C. or higher and 35° C. or lower. The third setting content for the fourth printing condition is that the temperature outside the image forming apparatus 1 is 36° C. or higher. Here, a value of the temperature outside the image forming apparatus 1 is an integer.

By executing the determination processing of S12, the controller 5 prioritizes the execution of the third conveying processing, the second conveying processing, and the first conveying processing in this order as the temperature outside the image forming apparatus 1 detected by the temperature sensor 13 increases. When the temperature outside the image forming apparatus 1 is high, the temperature of the fixing unit 4 is unlikely to decrease. Therefore, the FPOT can be shortened by advancing the conveying start timing of the sheet S as the temperature outside the image forming apparatus 1 increases.

{Fifth Printing Condition}

As shown in Table 1, the fifth printing condition is a conveying speed of the sheet S by the conveying unit 2. Thus, the plurality of printing conditions include the conveying speed of the sheet S by the conveying unit 2. The first setting content for the fifth printing condition is that the conveying speed of the sheet S is 31 ppm or more. The second setting content for the fifth printing condition is 21 ppm or more and 30 ppm or less. The third setting content for the fifth printing condition is 20 ppm or less. The unit "ppm" indicates "sheets/min". Further, a value of the conveying speed of the sheet S is an integer.

By executing the determination processing of S12, the controller 5 prioritizes the execution of the first conveying processing, the second conveying processing, and the third conveying processing in this order as the conveying speed of the sheet S increases. When the conveying speed of the sheet S is high, the temperature of the fixing unit 4 is likely to decrease. Therefore, by delaying the conveying start timing of the sheet S as the conveying speed of the sheet S increases, the sheet S can be prevented from being conveyed in a state where the temperature of the fixing unit 4 is decreased, and a failure of fixing the image onto the sheet S can be prevented from occurring.

{Sixth Printing Condition}

As shown in Table 1, the sixth printing condition is a setting of one-side printing or double-sided printing for the sheet S. Accordingly, the plurality of printing conditions include a setting of one-side printing or double-sided printing for the sheet S. The first setting content for the sixth printing condition is that one-side printing is set. The second setting content for the sixth printing condition is that double-sided printing is set. As shown in Table 1, the sixth printing condition does not have the third setting content.

In a case where double-sided printing is set, the controller 5 prioritizes execution of the second conveying processing over execution of the first conveying processing by executing the determination processing of S12. In a case where the double-sided printing is set, since the fixing unit 4 can store heat while the sheet S is turned over after one-side printing on the sheet S is completed, the temperature of the fixing unit 4 is unlikely to decrease. Therefore, when the double-sided printing is set, the FPOT can be shortened by advancing the conveying start timing of the sheet S. In a case where the double-sided printing is set, the controller 5 may prioritize execution of the third conveying processing over execution of the first conveying processing.

When it is determined in S12 that the first setting content corresponds to the sixth printing condition, that is, the printing is one-side printing, the controller 5 executes the first conveying processing. In a case where determined that the second setting content corresponds to the sixth printing condition, that is, the printing is double-sided printing, the controller 5 determines that the sixth printing condition is the last condition (YES in S15), and executes the second conveying processing (S16).

As described above, the controller 5 determines, according to the plurality of printing conditions, which of the first conveying processing, the second conveying processing, and the third conveying processing is to be executed. Therefore, the conveying start timing of the sheet S can be prevented from being unnecessarily delayed as compared with a case where the conveying processing is changed according to only a condition regarding the number of sheets to be printed.

The first temperature is a fixing temperature that is a target temperature for heat fixing executed by the fixing unit 4. In the first conveying processing and the second conveying processing, the controller 5 starts the conveying after the detection temperatures of the temperature detectors 46A and 46B reach the fixing temperature that is the target temperature for the heat fixing executed by the fixing unit 4. Therefore, a decrease in the fixing strength of the image onto the sheet S can be further prevented.

Further, the second temperature is preferably a temperature that is a lower limit value of a fixing possible temperature range of the fixing unit 4 when the sheet S reaches the nip portion N. Since the sheet S starts to be conveyed after the fixing unit 4 reaches a fixing possible temperature when the sheet S reaches the nip portion N, the fixing strength of the image onto the sheet S can be sufficiently maintained without causing a failure of fixing the image onto the sheet S.

{Priority Order}

Each of the first printing condition to the sixth printing condition has a priority order. In the determination processing of S12, when the controller 5 determines the setting content for each of the first printing condition to the sixth printing condition in order of the priority order, and in a case where determined that the first conveying processing or the third conveying processing is to be executed, the controller 5 does not determine the setting content for the printing conditions each having a subsequent priority order. When the plurality of printing conditions each has a priority order, the controller 5 can more appropriately determine the conveying start timing of the sheet Sin the determination processing of S12.

{First Modification}

The controller 5 may determine which of the first setting content to the third setting content corresponds to each of the first printing condition to the sixth printing condition, and execute the conveying processing corresponding to a setting content with the largest number of times of being determined as corresponding to a print condition among the first setting content to the third setting content. The first conveying processing corresponds to the first setting content, the second conveying processing corresponds to the second setting content, and the third conveying processing corresponds to the third setting content. For example, in a case where the setting content with the largest number of times of being determined as corresponding to the print condition among the first setting content to the third setting content is the first setting content, the controller 5 executes the first conveying processing.

{Second Modification}

The controller 5 may determine which of the first conveying processing, the second conveying processing, and the third conveying processing is to be executed, according to an elapsed time from reception of a previous print job as a seventh printing condition, in addition to the first printing condition to the sixth printing condition. The previous print job is a print job received one time before the print job received this time by the controller 5.

SECOND EMBODIMENT

Figure 7:
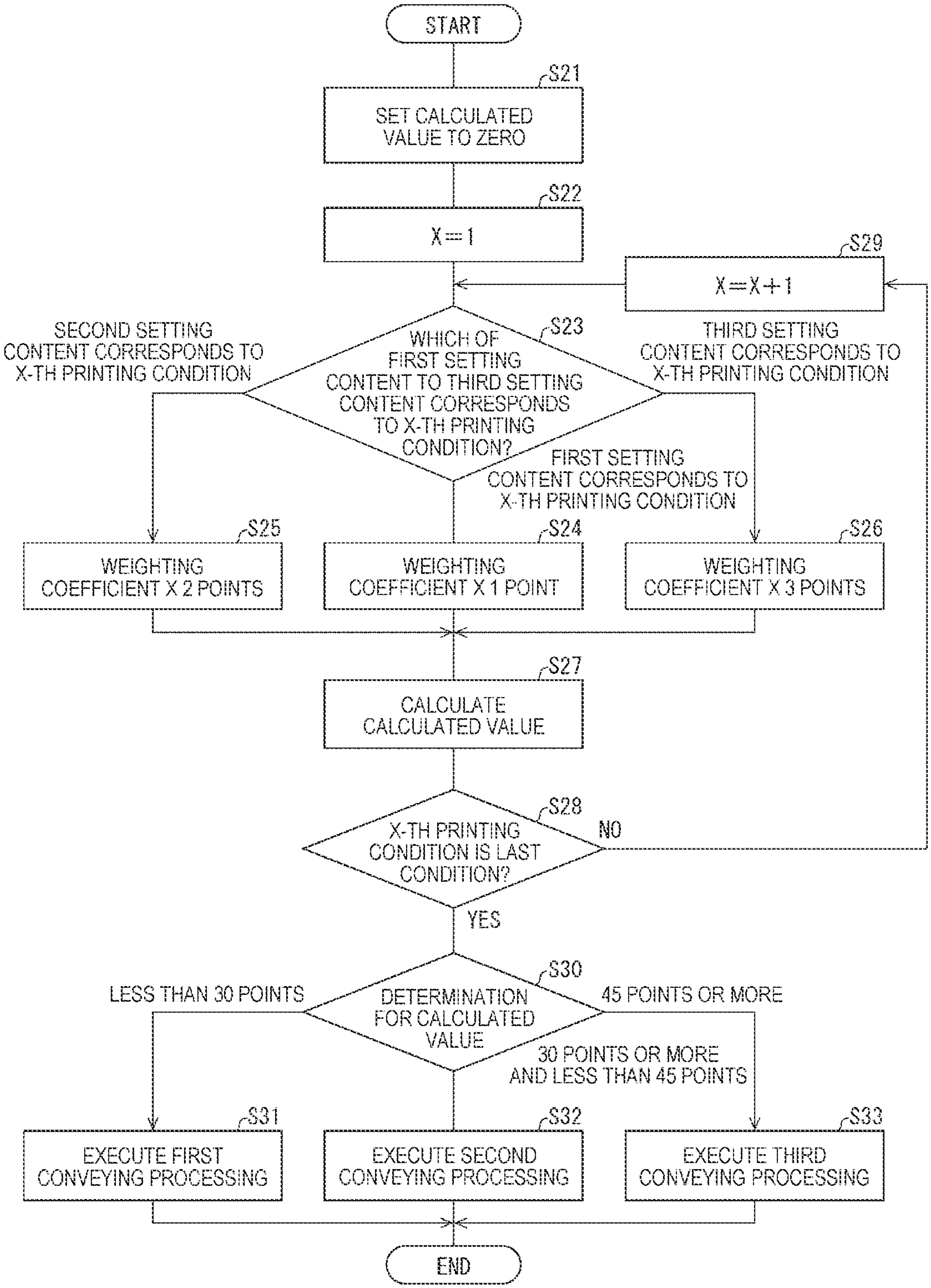
FIG. 7 is a flowchart showing an example of processing of the controller shown in FIG. 2 in a second embodiment of the present disclosure.

A second embodiment of the present disclosure will be described below. For convenience of description, members having the same functions as those described in the first embodiment are denoted by the same reference numerals, and the description thereof will not be repeated. FIG. 7 is a flowchart showing an example of processing of the controller 5 shown in FIG. 2 in the second embodiment of the present disclosure.

The controller 5 receives a print job from an external device of the image forming apparatus 1 via the communication unit 6. When receiving the print job, the controller 5 executes printing preparation processing. After executing the printing preparation processing, the controller 5 initializes a calculated value to 0 (S21). After initializing the calculated value to 0, the controller 5 executes processing of S22, which is the same processing as that of S11 shown in FIG. 6, and executes processing of S23, which is the same processing as that of S12 shown in FIG. 6.

Hereinafter, the first printing condition to the sixth printing condition in the present embodiment will be described in detail with reference to Table 2 below. Table 2 is an example of a table showing setting contents associated with respective printing conditions. The first printing condition to the sixth printing condition shown in Table 2 have weighting coefficients respectively corresponding to the first printing condition to the sixth printing condition in addition to the respective printing conditions shown in Table 1. Further, the first setting content to the third setting content shown in Table 2 have determination values respectively associated with the first setting content to the third setting content in addition to the setting contents shown in Table 1. The weighting coefficient associated with each printing condition and the determination value associated with each setting content are stored in the storage unit 52.

TABLE 2

| Printing condition | Item | Weighting | First setting content (first determination value) | Second setting content (second determination value) | Third setting content (third determination value) |
|---|---|---|---|---|---|
| First | The number of sheets to be printed | 5 | 51 ≤ N | 4 ≤ N ≤ 50 | 1 ≤ N ≤ 3 |
| Second | Length of sheet | 5 | 300 mm or more | 200 mm or more to less than 300 mm | Less than 200 mm |
| Third | Thickness of sheet | 5 | Thick | Medium | Thin |
| Fourth | Outside temperature | 1 | 20° C. or lower | From 21° C. to 35° C. | 36° C. or higher |
| Fifth | Conveying speed of sheet | 2 | 31 ppm or more | From 21 ppm to 30 ppm | 20 ppm or less |
| Sixth | One-side printing or double-sided printing | 2 | One-side printing | Double-sided printing | — |

As shown in Table 2, the weighting coefficient associated with each of the first printing condition to the third printing condition is, for example, 5, the weighting coefficient associated with the fourth printing condition is, for example, 1, and the weighting coefficient associated with each of the fifth printing condition and the sixth printing condition is, for example, 2.

Further, as shown in Table 2, for each of the first printing condition to the fifth printing condition, a first determination value is set in the first setting content, a second determination value is set in the second setting content, and a third determination value is set in the third setting content.

For example, the first determination value is 1 point, the second determination value is 2 points, and the third determination value is 3 points. As shown in Table 2, the sixth printing condition does not have the third setting content. Therefore, in the sixth printing condition, the first determination value is set in the first setting content, the second determination value is set in the second setting content, and the determination value corresponding to the third setting content is not set.

In a case where determined that the first setting content corresponds to the X-th printing condition, the controller 5 multiplies the weighting coefficient associated with the X-th printing condition by the first determination value corresponding to the first setting content (S24). For example, in S24, when X=1, the controller 5 obtains 5 points by multiplying 5 points as the weighting coefficient associated with the first printing condition by 1 point as the first determination value. The controller 5 adds, to the calculated value, a value obtained by multiplying the weighting coefficient associated with the X-th printing condition by the first determination value (S27). That is, the calculated value is obtained by calculating, for each of the first printing condition to the sixth printing condition, a value obtained by multiplying the weighting coefficient associated with each printing condition and the determination value associated with each setting content, and summing the values.

In a case where determined that the second setting content corresponds to the X-th printing condition, the controller 5 multiplies the weighting coefficient associated with the X-th printing condition by the second determination value corresponding to the second setting content (S25). For example, in S25, when X=1, the controller 5 obtains 10 points by multiplying 5 points as the weighting coefficient associated with the first printing condition by 2 points as the second determination value. In S27, the controller 5 adds, to the calculated value, a value obtained by multiplying the weighting coefficient associated with the X-th printing condition by the second determination value.

In a case where determined that the third setting content corresponds to the X-th printing condition, the controller 5 multiplies the weighting coefficient associated with the X-th printing condition by the third determination value corresponding to the third setting content (S26). For example, in S26, when X=1, the controller 5 obtains 15 points by multiplying 5 points as the weighting coefficient associated with the first printing condition by 3 points as the third determination value. In S27, the controller 5 adds, to the calculated value, a value obtained by multiplying the weighting coefficient associated with the X-th printing condition by the third determination value.

After the processing of S27, the controller 5 executes processing of S28, which is the same processing as that in S15 shown in FIG. 6. In a case where determined that the X-th printing condition is not the last condition (NO in S28), the controller 5 executes processing of S29 which is the same processing as that in S17 shown in FIG. 6. After executing the processing of S29, the controller 5 proceeds to the processing of S23.

In a case where determined that the X-th printing condition is the last condition (YES in S28), the controller 5 executes determination processing for the calculated value calculated in S27, that is, the total value (S30). Specifically, for example, in a case where determined that the first setting contents respectively correspond to the first printing condition to the sixth printing condition shown in Table 2, the controller 5 executes the determination processing for the total value obtained by summing the calculated values in the following (1) to (6).

(1) Weighting coefficient 5 corresponding to the first printing condition×1 point corresponding to the first determination value=5

(2) Weighting coefficient 5 corresponding to the second printing condition×1 point corresponding to the first determination value=5

(3) Weighting coefficient 5 corresponding to the third printing condition×1 point corresponding to the first determination value=5

(4) Weighting coefficient 1 corresponding to the fourth printing condition×1 point corresponding to the first determination value=1

(5) Weighting coefficient 2 corresponding to the fifth printing condition×1 point corresponding to the first determination value=2

(6) Weighting coefficient 2 corresponding to the sixth printing condition×1 point corresponding to the first determination value=2

In a case where determined that the X-th printing condition is the last condition is, for example, a case where the controller 5 acquires a value of X=6 in the determination processing of S28. That is, in a case where determined that the first setting content corresponds to the sixth printing condition, that is, in a case where determined that the printing is one-side printing, or in a case where determined that the second setting content corresponds to the sixth printing condition, that is, in a case where determined that the printing is double-sided printing, the controller 5 determines that the sixth printing condition is the last condition (YES in S28), and executes the processing of S30.

In a case where determined that the calculated value calculated in S27 is less than 30 points, the controller 5 executes processing of S31 that is the same processing as that of S13 shown in FIG. 6. For example, when the controller 5 determines that the first setting contents respectively correspond to the first printing condition to the sixth printing condition as in the above (1) to (6), a total value of the calculated values is 20 points, and the controller 5 determines that the calculated value in S27 is less than 30 points and executes the first conveying processing (S31).

In a case where determined that the calculated value calculated in S27 is equal to or greater than 30 points and less than 45 points, the controller 5 executes processing of S32 that is the same processing as that of S16 shown in FIG. 6. For example, when the controller 5 determines that the second setting contents respectively correspond to the first printing condition, the second printing condition, the fifth printing condition, and the sixth printing condition among the above (1) to (6), the respective calculated values are (1)=10 points, (2)=10 points, (3)=5 points, (4)=1 point, (5)=4 points, and (6)=4 points, and the total value is 34 points. Thus, the controller 5 determines that the calculated value in S27 is equal to or greater than 30 and less than 45, and executes the second conveying processing (S31).

In a case where determined that the calculated value calculated in S27 is equal to or more than 45 points, the controller 5 executes processing of S33 that is the same processing as that of S14 shown in FIG. 6. For example, when the controller 5 determines that the third setting contents respectively correspond to the first printing condition and the second printing condition and the second setting contents respectively correspond to the third printing condition to the sixth printing condition among the above (1) to (6), the respective calculated values are (1)=15 points, (2)=15 points, (3)=10 points, (4)=2 points, (5)=4 points, and (6)=4 points, and the total value is 50 points. Thus, the controller 5 determines that the calculated value in S27 is 45 points more, and executes the third conveying processing (S33).

The controller 5 executes the processing of S21 to S33 shown in FIG. 7 only for the first sheet S, and executes the third conveying processing for the second and subsequent sheets S. The controller 5 may execute the processing of S21 to S33 shown in FIG. 7 for not only the first sheet S but also the second and subsequent sheets S.

As described above, in the determination processing of S30, the controller 5 calculates, for each of the plurality of printing conditions, the calculated value by multiplying the determination value by the weighting coefficient, and determines which of the first conveying processing, the second conveying processing, and the third conveying processing is to be executed, based on the value obtained by summing the calculated values corresponding to the plurality of printing conditions. When each of the plurality of printing conditions has the weighting coefficient, the controller 5 can more appropriately determine the conveying start timing of the sheet S in the determination processing.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. An image forming apparatus comprising:
- a sheet tray configured to accommodate a sheet;
- an image forming unit configured to form an image on the sheet;
- a conveying unit configured to convey a sheet from the sheet tray toward the image forming unit;
- a fixing unit including a heater and a temperature detector that detects a temperature of the heater, the fixing unit being configured to fix an image formed on a sheet by the image forming unit; and
- a controller,
- wherein the controller is configured to execute:
  - first conveying processing of controlling the conveying unit to start conveying the sheet after a first time period has elapsed since the temperature detected by the temperature detector reaches a first temperature,
  - second conveying processing of controlling the conveying unit to start conveying the sheet in response to the temperature detected by the temperature detector reaches the first temperature,
  - third conveying processing of controlling the conveying unit to start conveying the sheet in response to the temperature detected by the temperature detector reaches a second temperature that is lower than the first temperature, and
  - determination processing of determining, according to a plurality of printing conditions including at least the number of sheets to be printed included in a print job, which of the first conveying processing, the second conveying processing, and the third conveying processing is to be executed.

2. The image forming apparatus according to claim 1,
- wherein the printing conditions include a length of the sheet in a conveying direction, and
- wherein the controller prioritizes execution of the third conveying processing, the second conveying processing, and the first conveying processing in this order as the length of the sheet in the conveying direction decreases.

3. The image forming apparatus according to claim 1,
- wherein the printing conditions include a thickness of the sheet, and
- wherein the controller prioritizes execution of the first conveying processing, the second conveying processing, and the third conveying processing in this order as the thickness of the sheet increases.

4. The image forming apparatus according to claim 1 further comprising:
- a temperature sensor configured to detect an external temperature outside the image forming apparatus,
- wherein the printing conditions include the external temperature, and
- wherein the controller prioritizes execution of the third conveying processing, the second conveying processing, and the first conveying processing in this order as the external temperature detected by the temperature sensor increases.

5. The image forming apparatus according to claim 1,
- wherein the printing conditions include a conveying speed of the sheet by the conveying unit, and
- wherein the controller prioritizes execution of the first conveying processing, the second conveying processing, and the third conveying processing in this order as the conveying speed of the sheet increases.

6. The image forming apparatus according to claim 1,
- wherein the printing conditions include a setting of one-side printing or double-sided printing for the sheet, and
- wherein when the double-sided printing is set, execution of the second conveying processing or the third conveying processing is prioritized over execution of the first conveying processing.

7. The image forming apparatus according to claim 1,
- wherein the printing conditions include an elapsed time from reception of a previous print job received one time before the print job received this time by the controller, and
- wherein the controller determines which of the first conveying processing, the second conveying processing, and the third conveying processing is to be executed according to the elapsed time.

8. The image forming apparatus according to claim 1,
- wherein the first temperature is a fixing temperature that is a target temperature for heat fixing executed by the fixing unit.

9. The image forming apparatus according to claim 1, wherein the fixing unit further includes an endless belt that rotates around the heater, and a pressing rotating body that defines a nip portion by nipping the belt between the pressing rotating body and the heater, and wherein the second temperature is a lower limit value of a fixing possible temperature range of the fixing unit when the sheet reaches the nip portion.

10. The image forming apparatus according to claim 1, wherein each of the plurality of printing conditions has a priority order, and wherein, in a case where the controller determines a setting content for each of the printing conditions in order of the priority order in the determination processing, and determines that the first conveying processing or the third conveying processing is to be executed, the controller skips determining a setting content for the printing conditions each having a subsequent priority order.

11. The image forming apparatus according to claim 1, wherein the controller determines which of the first conveying processing, the second conveying processing, and the third conveying processing is to be executed for each of the printing conditions, and executes one of the first conveying processing, the second conveying processing, and the third conveying processing with the largest number of times being determined to be executed.

12. The image forming apparatus according to claim 1, wherein a weighting coefficient is associated with each of the plurality of printing conditions, and a determination value corresponding to a setting content for each of the plurality of printing conditions are set, and wherein the controller is configured to:

in the determination processing, calculate, for each of the plurality of printing conditions, a calculated value by multiplying the determination value by the weighting coefficient, and determine which of the first conveying processing, the second conveying processing, and the third conveying processing is to be executed, based on a value obtained by summing the calculated value corresponding to each of the plurality of printing conditions.

13. The image forming apparatus according to claim 12, wherein the controller determines which one of the first conveying processing, the second conveying processing, and the third conveying processing is to be executed only for a first sheet and executes one of the first conveying processing, the second conveying processing, and the third conveying processing that is determined to be executed for the first sheet, and wherein the controller executes the third conveying processing for a second sheet and subsequent sheets.

14. The image forming apparatus according to claim 12, wherein the controller determines which one of the first conveying processing, the second conveying processing, and the third conveying processing is to be executed for a first sheet and subsequent sheets and executes one of the first conveying processing, the second conveying processing, and the third conveying processing that is determined to be executed for the first sheet and the subsequent sheets.

15. An image forming apparatus comprising:

a sheet tray configured to accommodate a sheet;

an image forming unit configured to form an image on the sheet;

a conveying unit configured to convey a sheet from the sheet tray toward the image forming unit;

a fixing unit including a heater and a temperature detector that detects a temperature of the heater, the fixing unit being configured to fix an image formed on a sheet by the image forming unit; and a controller, wherein the controller is configured to execute:

receiving a print job from external device;

starting to provide power to the heater in reception of the print job; and determining which one of a first conveying processing, a second conveying processing, and a third conveying processing is to be executed in accordance with a setting content for a plurality of printing conditions, wherein the first conveying processing is to start conveying the sheet by the conveying unit after a first time period is elapsed since the temperature detected by the temperature detector reached to a first temperature, wherein the second conveying processing is to start conveying the sheet by the conveying unit before the first time period is elapsed since the temperature detected by the temperature detector reached to the first temperature, and wherein the third conveying processing is to start conveying the sheet by the conveying unit before the first time period is elapsed since the temperature detected by the temperature detector reached to a second temperature that is lower than the first temperature.

* * * * *